3,198,800
2,8-(PARA-F-4-OXO-BUTYL)-DIAZASPIRO[4,5]-
DECANE-1,3-DIONES
Ernst Jucker, Ettingen, and Rudolph Süess, Bettingen,
 Switzerland, assignors to Sandoz Ltd., Basel,
 Switzerland
No Drawing. Filed May 7, 1964, Ser. No. 365,792
12 Claims. (Cl. 260—294)

This application is a continuation in part of Ser. No. 306,272, filed September 3, 1963, now abandoned, which in turn was a continuation in part of Ser. No. 148,036, filed October 27, 1961, now abandoned.

The preesnt invention relates to new diazaspiro compounds and to a process for their production.

The present invention provides compounds of the general Formula I,

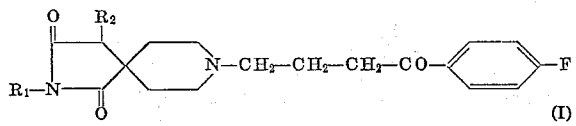
(I)

in which $R_1$ signifies a lower alkyl radical or a benzyl radical, and $R_2$ signifies a hydrogen atom, a lower alkyl radical, or a benzyl or penethyl radical which may optionally be substituted by a chlorine or bromine atom or a trifluoromethyl, methyl, ethyl, methoxy or ethoxy group, their acid addition salts and pharmaceutical compositions containing, in addition to an inert carrier, a compound I and/or an acid addition salt thereof.

The present invention also provides a process for the production of the compounds I and their acid addition salts, characterised in that a substituted succinimide of general Formula II,

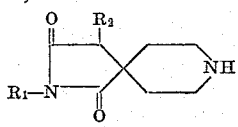
(II)

in which $R_1$ and $R_2$ have the above significance, is reacted with a compound of general Formula III

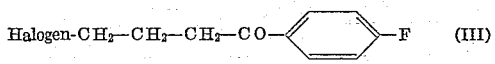
(III)

in the presence of a alfialine condensation agent, and when an acid addition salt is desired, salification is effected with an organic or inorganic acid, e.g. hydrochloric, hydrobromic, sulphuric, citric, oxalic, tartaric, succinic, maleic, acetic, benzoic, hexahydrobenzoic, methane sulphonic, fumaric, gallic or malic acid; it should be noted that an excess of compound II may be used as the alkaline condensation agent.

Compounds I at room temperature are colourless solid crystalline compounds which are easily soluble in the usual organic solvents, e.g. methanol, ethanol, acetone or benzene. With organic and inorganic acids they form salts which at room temperature are generally stable and crystalline.

Compounds I may be used as pharmaceuticals. They have a peripheral and central action on the nervous system, e.g. sedation, narcosis potentiation and elevation of the convulsive threshold. They inhibit the conditioned escape reaction in rats as well as emotional stress reactions, and decrease spontaneous activity of mice and excitation caused by amphetamine administration in animals. Their cataleptic effect is very slight in the doses which inhibit emotional reactions and also their toxicity is low. The compounds I may be used as neuroleptics in the treatment of a great variety of phychic excitation syndromes. 2 - methyl-8-(4'-p-fluorophenyl-4'-oxo-butyl)-2,8-diazaspiro [4,5]decane-1,3-dione is a particularly good neuroleptic, e.g. for treating stuporous catatonia, and the corresponding 2,4-dimethyl derivative is even somewhat more potent. With said compounds, for example, the therapeutically effective amount may consist of from 10 to 60 mg. of active principle per day.

The compounds III are known. The compounds II used as starting material may, for example be prepared as follows: 1-benzyl-4-piperidone is converted to the required (1-benzyl-4-piperidylidene)-cyanoacetic acid alkyl ester in an inert organic solvent, e.g. benzene, toluene, xylene or tetraline, with a suitable cyanoacetic acid alkyl ester in the presence of a catalyst for splitting off water or a catalyst mixture, e.g. glacial acetic acid and ammonium acetate, and in the presence of a continuous water separator. The elements of hydrocyanic acid are added at the double bond of this derivative Instead of 1-benzyl-4-piperidone, it is possible to use 1-benzoyl-4-piperidone as starting material and apply to that compound the above mentioned reaction sequence. The resulting compound of Formula IV,

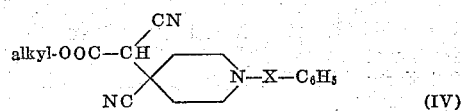
(IV)

wherein X stands for $CH_2$ or CO, is saponified with concentrated hydrochloric acid and decarboxylated, whereby simultaneous splitting off of the benzoyl group occurs. The obtained compound corresponds to Formula V,

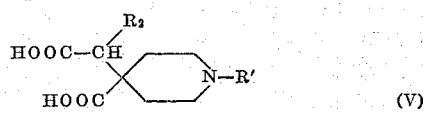
(V)

wherein R' stands for H or benzyl and $R_2$ stands for a hydrogen atom. When it is desired to prepare a compound of Formula II, wherein $R_2$ stands for an alkyl, benzyl, phenethyl substituent, or a substituted benzyl or phenethyl group, the benzoyl-compound IV (X=CO) is at first heated with the corresponding alkyl, benzyl or phenethyl halide and the obtained compound then saponified and decarboxylated to the succinic acid of Formula V (R'=H, $R_2$=substituent). When the substituent $R_2$ is a branched alkyl chain or a benzyl or substituted benzyl group, a preferred method of effecting the saponification and decarboxylation consists in that the compound is heated first with 5-N hydrochloric acid (to split off the benzoyl group), secondly with a suitable alkaline agent and thereafter with a strong inorganic acid, e.g. concentrated hydrochloric acid. Compound V is esterified with an absolute alkanol and hydrogen chloride to form the corresponding dialkyl ester. The substituted succinic acid diester is converted to the desired substituted 2,8-diazaspiro[4,5]decane-1,3-dione of the Formula VI

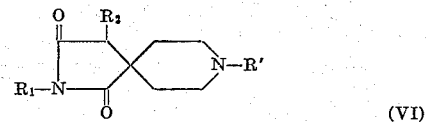
(VI)

by heating with a nitrogen compound of general formula $R_1$—$NH_2$, in which $R_1$ has the above significance, e.g. a primary alkylamine, e.g. methylamine, ethylamine, etc. or benzylamine, preferably in a closed vessel. For the purpose of quantitative cyclisation the mixture is heated, e.g. to 180–250°, at normal pressure. When the resulting compound is substituted with a benzyl group at the piperidine moiety, it is then hydrogenated in a lower aliphatic alcohol with hydrogen in the presence of a palladium catalyst until no further hydrogen is taken up. The resulting compound II may be purified by distillation in a vacuum or by recrystallisation of its salts.

The compounds herein described are intended for use in the therapy; for this purpose, they are administered preferably in the form of their non-toxic, therapeutically useful acid addition salts, examples thereof have been mentioned hereinbefore.

In the following non-limitative examples all temperatures are stated in degrees centigrade. The melting and boiling points are corrected.

EXAMPLE 1

*2-methyl-8-(4'-p-fluorophenyl-4'-oxobutyl)-2,8-diazaspiro[4,5]decane-1,3 dione*

4.1 g. of 2-methyl-2,8-diazaspiro[4,5]decane-1,3-dione, 4.8 g. of 4-chloro-p-fluoro-butyrophenone and 8 g. of anhydrous soda in 50 cc. of n-butanol are heated to 120° for 24 hours. The solution is then decanted from the soda. A portion of the condensation product already precipitates whilst still warm. The mixture is filtered whilst hot, evaporated to dryness and the residue extracted with ethanol. The ethanol extract is combined with the filter residue from above, and excess of 2 N hydrochloric acid poured over the substance, which is only slightly soluble in all the usual solvents, and the solution evaporated in a vacuum at 80° until dry. The remaining residue is recrystallised firstly from ethanol and then from water. 2methyl-8-(4'-p-fluorophenyl-4'-oxo-butyl)-2,8-diazaspiro[4,5]decane-1,3-dione hydrochloride melts at 285–286°.

The 2-methyl-2,8-diazaspiro[4,5]decane-1,3-dione used as a starting material may, for example, be produced as follows: Cyanoacetic acid ethyl ester and 1-benzyl-4-piperidone are heated at a reflux with some glacial acetic acid and ammonium acetate in benzene with continuous separation of water, (1-benzyl-4-piperidylidene)-cyanoacetic acid ethyl ester resulting; from ether/petroleum ether yellow crystals having a melting point of 70–71°. By treating the piperdylidene compound with potassium cyanide in aqueous ethanol the elements of hydrocyanic acid are added at the double bond, the resulting compound is saponified with hydrochloric acid and decarboxylated and the resulting substituted succinic acid esterified with absolute ethanolic hydrogen chloride. [(1-benzyl-+-ethoxy-carbonyl-piperidyl)-4]-acetic acid ethyl ester boils at 150°/0.03 mm. of Hg (temperature measured in the air bath); light yellow oil. The diester is heated to 180° with liquid methylamine in a closed vessel; after cooling, the excess of methylamine is left to evaporate and the crystalline residue heated to 200°, whereby methylamine and ethanol are split and the residue melts. 2-methyl-8-benzyl-2,8-diazaspiro[4,5]decane-1,3-dione crystallised from ethanol in large colourless prisms having a melting point of 111–112°. The compound is hydrogenated in ethanol with hydrogen in the presence of a palladium catalyst on activated charcoal at normal pressure and room temperature. 2-methyl-2,8-diazaspiro[4,5]decane-1,3-dione boils at 99°/0.02 mm. of Hg (temperature measured in an air bath); strongly hygroscopic substance which crystallises in rectangular prisms having a melting point of 67°.

EXAMPLE 2

*2-methyl-8-(4'-p-fluorophenyl-4'-oxo-butyl)-2,8-diazaspiro[4,5]decane-1,3-dione*

23.1 g. of 2-methyl-2,8-diazaspiro[4,5]decane-1,3-dione (0.127 mol), 12.7 g. of 4-chloro-p-fluoro-butyrophenone (0.0635 mol) and 0.1 g. of potassium iodide are heated to 130° in 80 cc. of absolute toluene for 36 hours in a closed vessel. After cooling the crystalline reaction mixture is washed out with benzene and filtered; the residue consists of 2-methyl-2,8-diazaspiro[4,5]decane-1,3-dione hydrochloride, melting point 281° after drying in a water jet vacuum. The filtrate is freed of the solvent in a vacuum at 70°. A red oil results which crystallises upon acidification to Congo red with ethanolic hydrochloric acid. 40 cc. of ether are added and the solution filtered after standing for 4 hours in the ice box. The residue is recrystallised from water; 2-methyl-8-(4'-p-fluorophenyl-4'-oxo-butyl)-2,8-diazaspiro[4,5]decane-1,3-dione hydrochloride melts at 285–286°.

The 2-$R_1$-8-(4'-p-fluorophenyl-4'-oxo-butyl)-2,8-diazaspiro[4,5]decane-1,3-dione shown in Table I below are produced from 4-chloro-p-fluoro-butyrophenone and the corresponding 2-substituted 2,8-diazaspiro [4,5]decane-1,3-diones in a manner analogous to that described in Example 1. The properties of the starting materials II and the compounds VI are also shown in Table I. The production of compounds II is effected in a manner analogous to that described in Example 1.

TABLE I

| Example No. | Compound | M.P. or B.P. | M.P. determined after crystallisation from— |
|---|---|---|---|
| (3) $R_1$=ethyl | I (hydrochloride) | 282–284° (decomp.) | Methanol. |
| | II (free base) | 118°/0.06 mm of Hg colourless oil. | |
| | VI (free base) | 104° | Ethanol. |
| (4) $R_1$=isopropyl | I (hydrochloride) | 276–278° | Ethanol. |
| | II (free base) | 110°/0.05 mm of Hg colourless oil, crystallising upon cooling, M.P. 79–82°. | |
| | VI (hydrochloride) | 298–302° (decomp.) | Ethanol. |
| (5) $R_1$=n-butyl | I (free base) | 95° | Ethanol. |
| | Neutral naphthaline-1,5-disulphonate. | 239–241° | Methanol. |
| | II | 120/0.06 mm of Hg colourless oil, crystallising upon cooling, M.P. 60°. | |
| | VI (hydrochloride) | 273° | Ethanol. |
| (6) $R_1$=benzyl | I (free base) | 120–122° | Methanol. |
| | II (free base) | 196/0.1 mm of Hg colourless, viscous oil. | |
| | VI (hydrochloride) | 236–238° | Methanol with the addition of ether. |

EXAMPLE 7

*2,4-dimethyl-8-(4'-p-fluorophenyl-4'-oxo-butyl)-2,8-diazaspiro[4,5]decane-1,3-dione*

6.1 g. of 2,4-dimethyl-2,8-diazaspiro[4,5]decane-1,3-dione (0.031 mol) and 3.8 g. 4-bromo-p-fluoro-butyrophenone (0.015 mol) are heated in 20 cc. of benzene during 24 hours at 80°. The precipitate is filtered off and the filtrate evaporated to dryness. The dark oil remaining is taken up in ethanol and gaseous hydrobromic acid passed through until this solution reads weakly acid to Congo red. Precipitation is effected with ether and recrystallization from ethanol/ether yields 2,4-dimethyl-8-(4'-p-fluorophenyl-4'-oxo-butyl) - 2,8 diazaspiro[4,5]decane-1,3-dione hydrobromide melting at 205°.

2,4-dimethyl-2,8-diazaspiro[4,5]decane-1,3-dione used as starting material may be prepared as follows:

(a) α-[(1-BENZOYL-4-CYANO-PIPERIDYL)-4]-α-CYANO-PROPIONIC ACID ETHYL ESTER 1-benzoyl-4-piperidone is condensed with cyanoacetic acid ethyl ester and the resulting piperidylidene compound has added to it potassium cyanide. Sodium ethylate solution is produced from 200 cc. of absolute ethanol and 5.1 g. of sodium and whilst stirring and cooling with ice 71.8 g. [(1-benzoyl-4-cyano-piperidyl)-4]-cyanoacetic acid ethyl ester are added. Heating under reflux is effected for half an hour, the red, cloudy solution is then cooled with ice and subsequently 47.1 g. of methyl iodide are added. Heating at reflux is effected for 16 hours, the solution is evaporated to dryness at reduced pressure, benzene is added to the residue and heating is effected for a short time at reflux. After cooling and filtering off crystallised sodium iodide the benzene solution is washed successively with 2 N hydrochloric acid, sodium hydrogen carbonate solution and water. Drying over sodium sulfate is effected and the benzene extract is evaporated. Thus a viscous oil remains which cristallises on ethanol being added. The compound melts at 132–134° after thrice recristallising of ethanol.

(b) α-[(4-ETHOXYCARBONYL-PIPERIDYL)-4]-PROPIONIC ACID ETHYL ESTER 70.4 g. of α-[(1-benzoyl-4-cyano-piperidyl)-4]-α-cyanopropionic acid ethyl ester are heated under reflux with 600 cc. of concentrated hydrochloric acid during 48 hours. The reaction mixture is then evaporated to dryness, the residue dried over phosphorus pentoxide and 400 cc. of ethanol are then poured over this material. Dry gaseous hydrochloric acid is bubbled into the solution while cooling with ice, heating under reflux is effected for 48 hours and the solution is evaporated to dryness with the exclusion of water. The residue is taken up in chloroform and the chloroform solution shaken with saturated potash solution and dried over sodium sulfate. After evaporating the chloroform a dark oil remains which is distilled in a high vacuum. α-[4-ethoxycarbonyl-piperidyl)-4]-propionic acid ethyl ester boiled at 110–112°/0.07 mm. of Hg, $n_D^{22}$=1.4678.

(c) 2,4-DIMETHYL-2,8-DIAZASPIRO[4,5]DECANE-1,3-DIONE 15.4 g. of α-[4-ethoxycarbonyl-piperidyl)-4]-propionic acid ethyl ester and 75 cc. of 14% methanolic methylamine solution are heated in a pressure vessel for 24 hours at 220°. The reaction mixture is evaporated to dryness and the residue heated at atmospheric pressure to 200° for half an hour in a gentle current of nitrogen. The remaining dark oil is converted to the hydrochloride with an ethanolic solution of hydrocholric acid; by adding ether the hydrochloride precipitates. 2,4-dimethyl-2,8-diazaspiro[4,5]decane-1,3-dione hydrochloride melts at 244° after recristallising from ethanol/ether. In order to convert it to the free base dissolution in a small amount of water is effected and potash is added in quantity sufficient to form a paste. This is stirred with chloroform, the chloroform solution is dried over solid potash, the solvent is evaporated and the remaining oil distilled in a high vacuum. Boiling point 119°/0.08 mm. of Hg.

EXAMPLE 8

2-methyl-4-isopropyl-8-(4'-p-fluorophenyl-4'-oxobutyl)-2,8-diazaspiro[4,5]decane-1,3-dione 4.4 g. of 2-methyl-4-isopropyl-2,8-diazaspiro[4,5]decane-1,3-dione and 1.9 g. of 4-chloro-p-fluorobutyrophenone are heated to the boil in 50 cc. of abs. xylene for 18 hours. The precipitate is filtered off, the xylene solution evaporated under reduced pressure at 60° and the residue chromatographed on 100 g. of neutral aluminum oxide. The yellow colored, viscous oil is eluted with a mixture of benzene/ether, the oil taken up in ethanol and abs. ethanolic hydrochloric acid added to the solution to Congo red indicator. The crystalline precipitate is thereupon filtered off, the hydrochloric acid filtrate concentrated to 10 cc. and 5 cc. of water are added thereto and the mixture heated to the boil with 2 g. of naphthaline-1,5-disulfonic acid. The salt, which crystallises after standing for 18 hours, melts at 270–272° and is 2-methyl-4-isopropyl - 8-(4'-p-fluorophenyl-4'-oxobutyl)-2,8-diazaspiro[4,5]decane-1,3-dione-naphthalene-1,5-disulfonate (pure). 1 mol of the acid combines with 2 mols of the base.

The 2-methyl-4-isopropyl-2,8-diazaspiro[4,5]decane-1,3-dione, used as a starting material, may, for example, be produced as follows:

(a) α[(1-BENZOYL-4-CYANO-PIPERIDYL)-4]-α-CYANO-ISOVALERIANIC ACID ETHYL ESTER 1-benzoyl-4-piperidone is condensed with cyano ethyl acetate and potassium cyanide reacted with the resulting piperidylidene compound.

A sodium ethylate solution is produced from 300 cc. of abs. ethanol and 7.6 g. of sodium whereupon 100 g. of [(1-benzoyl-4-cyano-piperidyl)-4]ethyl cyano acetate are added whilst stirring and cooling with ice. The mixture is heated for ½ hour at reflux whereupon the red colored solution is cooled with ice and subsequently 60.0 g. of isopropyl bromide are dropwise added thereto. The mixture is then heated at reflux for 36 hours and the reaction mixture subsequently evaporated to dryness. The brown, half-crystalline residue is shaken out between benzene and water; the benzene layer is washed in turn once with a 2 N sodium hydroxide solution, a 2 N hydrochloric acid, a saturated sodium bicarbonate solution and water. The benzene solution is dried over sodium sulfate and evaporated to dryness.

(b) 2-METHYL-4-ISOPROPYL-2,8-DIAZASPIRO[4,5]DECANE-1,3-DIONE 66.0 g. of the resulting crude α-[(1-benzoyl-4-cyanopiperidyl)-4]-α-isovalerianic acid ethyl ester are heated to the boil for 20 hours in 500 cc. of 5 N hydrochloric acid for purpose of splitting off the benzoyl group. The crystalline benzoic acid is removed from the cooled reaction mixture by filtration and subsequent extraction with ether. The aqueous, acid phase is evaporated under reduced pressure at 80°. 500 cc. a of 20% potassium hydroxide solution are added to the mixture, the mixture is heated to the boil at reflux for 12 hours and 400 cc. of 5 N hydrochloric acid are added thereto. Thereafter, the mixture is evaporated to dryness, the resulting residue, which has had a relatively large quantity of potassium chloride added thereto, is heated to the boil with ethanol and the residue filtered off. The filtrate is evaporated to dryness, the residue heated at reflux for 60 hours in 400 cc. of concentrated hydrochloric acid and then again evaporated to dryness.

750 cc. of 35% aqueous monomethylamine solution are then added thereto and the mixture heated, by slowly raising the temperature to 260°, the liquid distilling off slowly. The reaction mixture is maintained at this temperature for 1 hour and subsequently extracted with 500 cc. of boiling chloroform, whereafter the mixture is filtered and the filtrate evaporated to dryness. The residue remaining in the flask is taken up in 20 cc. of water, a relatively large quantity of potassium carbonate added thereto and the entire mixture extracted a number of times with chloroform. The combined chloroform extracts are dried over sodium sulfate, the chloroform is evaporated and the residue distilled in a high vacuum whereupon 2-methyl - 4-isopropyl - 2,8 - diazaspiro[4,5]decane - 1,3-dione, which boils at 123–125°/0.09 mm. of Hg.

EXAMPLE 9

*2-methyl-4-n-butyl-8-(4'-p-fluorophenyl-4'-oxo-butyl)-2,8-diazaspiro[4,5]decane-1,3-dione*

The compound is produced in accordance with the same process as described in the previous example. Boiling point 205–210°/0.1 mm. of Hg; yellow, viscous oil which crystallises upon cooling.

For the purpose of producing the maleate, 1.7 g. of the distilled compound are dissolved in 8 cc. of ethanol and heated to the boil with 0.5 g. of maleic acid. After recrystallisation from methanol/ether, the 2-methyl-4-n-butyl-8-(4'-p-fluorophenyl - 4' - oxo - butyl)-2,8-diazspiro[4,5]decane-1,3-dione-maleate melts at 153–155°. 1 molecule of maleic acid combines with 1 molecule of the base. The 2-methyl-4-n-butyl - 2,8 - diazaspiro[4,5]decane-1,3-dione used as a starting material boils at 112–116°/0.12 mm. of Hg and is in the form of a yellowish, viscous oil. This compound is produced in accordance with the already described process in that [(1-benzoyl-4-cyano-piperidyl)-4]-ethyl cyano acetate has n-butyl iodide added thereto whereafter the resulting α-[(1-benzoyl-4-cyano-piperidyl)-4]-α-cyano-capronic acid ethyl ester is treated with methylamine.

EXAMPLE 10

*2-methyl-4-benzyl-8-(4'-p-fluorophenyl-4'-oxobutyl)-2,8-diazaspiro[4,5]decane-1,3-dione*

8.9 g. of 2-methyl-4-benzyl-2,8-diazaspiro[4,5]decane-1,3-dione and 3.3 g. of 4-chloro-p-fluoro-butyrophenone are heated to the boil in 100 cc. of abs. xylene for 24 hours. The mixture is cooled whereupon the separated, colorless crystalline precipitate is filtered off (melting point 194–196°). This is the hydrochloride of the unconverted 2-methyl-4-benzyl - 2,8 - diazaspiro[4,5]decane-1,3-dione. The filtrate is washed once with water and then extracted twice, each time with 75 cc. of 15% tartaric acid solution. The combined tartaric acid extracts are made strongly alkaline with a potassium carbonate solution and the compound, which has separated as an oil, is taken up in choloroform. The chloroform solution is washed with water, dried over sodium sulfate and the chloroform evaporated to dryness in a vacuum. The resulting yellow, viscous oil, is distilled in a vacuum at 250°/0.05 mm. of Hg. After recrystallising from ethanol the 2-methyl-4-benzyl-8-(4'-p-fluorophenyl-4'-oxobutyl) - 2,8 - diazaspiro[4,5]decane-1,3-dione melts at 95–96°.

The 2-methyl-4-benzyl - 2,8-diazaspiro[4,5]decane-1,3-dione, used as a starting material, may, for example, be produced as follows:

(*a*) α-[(1-BENZOYL-4-CYANO-PIPERIDYL)-4-]-α-CYANO-β-PHENYL-PROPIONIC ACID ETHYL ESTER 1-benzoyl-4-piperidone is condensed with cyano acetic acid ethyl ester whereupon the resulting piperidylidene compound is reacted with potassium cyanide. A sodium ethylate solution is prepared from 1000 cc. of abs. ethanol and 19.0 g. of sodium whereafter 250 g. of [(1-benzoyl-4-cyano-piperidyl)-4]-ethyl cyano acetate are added whilst stirring and cooling with ice. The mixture is heated at reflux for ½ hour, whereupon 147.0 g. of benzyl chloride are added dropwise to the red colored solution whilst stirring and cooling with ice. The mixture is heated at reflux for 18 hours, the solution evaporated to dryness at a reduced pressure at 60° whereupon benzene is added to the residue and the mixture heated to reflux for a short time. After cooling the mixture is washed once with water whereafter the benzene solution is extracted consecutively with 2 N sodium hydroxide solution, a 2 N hydrochloric acid, a saturated sodium bicarbonate solution and again with water. The mixture is dried over sodium sulfate and the benzene extract is evaporated to dryness. The residue crystallises after ethanol is added. After recrystallisation from ethanol, the compound melts at 146–148°.

(*b*) α-[(4-CYANO-PIPERIDYL)-4-]-α-CYANO-β-PHENYL-PROPIONIC ACID ETHYL ESTER 80 g. of α[(1-benzoyl-4-cyano-piperidyl)-4]-α-cyano-β-phenyl propionic acid ethyl ester are heated at reflux together with 1000 cc. of 5 N hydrochloric acid and 250 cc. of ethanol for 18 hours. The resulting benzoic acid which crystallises from the cooled reaction mixture is extracted by filtration and subsequent extraction with ether. The aqueous layer is evaporated to dryness and reduced pressure at 80°, the residue dissolved in 150 cc. of water and a saturated potassium carbonate solution added thereto until the mixture gives a strong alkaline reaction. The oil which separates is taken up in benzene, the benzene solution is washed with water and dried over sodium sulfate. The mixture is evaporated to dryness and crystallisation is effected from ether/petroleum ether; melting point 103–105°.

(*c*) 2-METHYL-4-BENZYL-2,8-DIAZASPIRO[4,5]DECANE-1,3-DIONE 60 g. of α-[(4-cyano-piperidyl)-4]-α-cyano-β-phenyl-propionic acid ethyl ester are heated at reflux in a solution of 220 g. of potassium hydroxide in 1000 cc. of water and 100 cc. of ethanol for 48 hours; the crystalline precipitate which initially separates eventually goes into solution once more. The mixture is then cooled and appr. 800 cc. of 5 N hydrochloric acid are added so that the solution is clearly acid to congo red indicator. The mixture is evaporated to dryness at reduced pressure at 80°, heated to the boil with ethanol and the separated potassium chloride filtered off. The filtrate is evaporated to dryness, 1000 cc. of concentrated hydrochloric acid poured thereon, again heated to the boil at reflux for 36 hours and again evaporated to dryness.

The crystalline residue is taken up in 500 cc. of an aqueous 35% monomethylamine solution and the excess monomethylamine and the water are evaporated off by slowly increasing the temperature at normal pressure. After the oil-bath temperature has reached 260°, the contents of the flask spontaneously begin to froth. This temperature is maintained for 1½ hours and the mixture then cooled. The contents of the flask which have crystallised are dissolved in 300 cc. of water, an excess of saturated potassium carbonate solution is added thereto and the separated oil is taken up in benzene. The benzene solution is dried over sodium sulfate and the benzene evaporated. The 2-methyl-4-benzyl-2,8-diazaspiro[4,5]decane-1,3-dione distills at 150°/0.05 mm. of Hg as a colorless, viscous oil and forms a colorless, crystalline, hygroscopic hydrochloride, which melts at between 175 and 198° depending upon the crystallisation conditions (from methanol or ethanol).

EXAMPLE 11

*2-benzyl-4-methyl-8(4'-p-fluorophenyl-4'-oxobutyl)-2,8-diazaspiro[4,5]decane-1,3-dione*

The production is effected in accordance with the process already described. The compound forms a hydrochloride having a melting point of 206–208° after recrystallisation from ethanol/ether. The 2-benzyl-4-methyl-2,8-diazaspiro[4,5]decane-1,3-dione, used as starting material, boils at 160–170°/0.1 mm. of Hg. It is produced in accordance with the already described process in that methyl iodide is added [(1-benzoyl-4-cyano-piperidyl)-4]-cyano-acetic acid ethyl ester and the resulting α-[4-ethoxy-carbonyl-piperidyl)-4]-propionic acid ethyl ester is treated with benzylamine.

EXAMPLE 12

*2-methyl-4-phenylethyl-8-(4'-p-fluorophenyl-4'-oxobutyl)-2,8-diazaspiro[4,5]decane-1,3-dione*

The production is effected in accordance with the already described process. After recrystallisation from water, the compound forms a naphthaline-1,5-disulfonate having a melting point of 258–260°. 1 molecule of acid combines with 2 molecules of the base.

The 2-methyl-4-phenylethyl-2,8-diazaspiro[4,5]decane-1,3-dione boils at 180–190°/0.08 mm. of Hg (temperature measured in the air-bath). It is produced in accordance with the already described process in that [(1-benzoyl-4-cyano-piperidyl)-4]-cyano-acetic acid ethyl ester is converted with phenylethyl bromide and the resulting α-[(1-benzoyl-4-cyano-piperidyl)-4]-α-cyano-γ-phenyl-buteric acid ethyl ester is treated with methylamine.

The following compounds are produced in accordance with the above described process:

EXAMPLE 13

2-methyl-4-(4″-chlorobenzyl)-8-(4′-p-fluorophenyl-4′-oxobutyl)-2,8-diazaspiro[4,5]decane-1,3-dione.

EXAMPLE 14

2-methyl-4-(4″-methylbenzyl)-8-(4′-p-fluorophenyl-4′-oxobutyl)-2,8-diazaspiro[4,5]decane-1,3-dione.

EXAMPLE 15

2-methyl-4-(4″-methoxybenzyl)-8-(4′-p-fluorophenyl-4′-oxobutyl)-2,8-diazaspiro[4,5]decane-1,3-dione.

EXAMPLE 16

2-methyl-4-(3″-trifluoromethylbenzyl)-8-(4′-p-fluorophenyl-4′-oxobutyl)-2,8-diazaspiro[4,5]decane-1,3-dione.

EXAMPLE 17

2-methyl-4-(4″-chlorophenethyl)-8-(4′-p-fluorophenyl-4′-oxobutyl)-2,8-diazaspiro[4,5]decane-1,3-dione.

EXAMPLE 18

2-methyl-4-(4″-methoxyphenethyl)-8-(4′-p-fluorophenyl-4′-oxobutyl)-2,8-diazaspiro[4,5]decane-1,3-done.

Having thus disclosed the invention, what we claim is:
1. A compound selected from the group consisting of succinimides having the formula

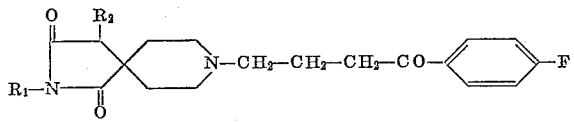

in which $R_1$ is a member of the group consisting of lower alkyl and benzyl, and $R_2$ is a member of the group consisting of hydrogen, lower alkyl, benzyl, phenethyl, monosubstituted benzyl and monosubstituted phenethyl, wherein the substituent is one of chlorine, bromine, trifluoromethyl, methyl, ethyl, methoxy and ethoxy, and nontoxic, therapeutically useful acid addition salts thereof.

2. 2-methyl-8-(4′-p-fluorophenyl-4′-oxobutyl)-2,8-diazaspiro[4,5]decane-1,3-dione.

3. 2-ethyl-8-(4′-p-fluorophenyl-4′-oxobutyl)-2,8-diazaspiro[4,5]decane-1,3-dione.

4. 2-isopropyl-8-(4′-p-fluorophenyl-4′-oxobutyl)-2,8-diazaspiro[4,5]decane-1,3-dione.

5. 2-n-butyl-8-(4′-p-fluorophenyl-4′-oxobutyl)-2,8-diazaspiro[4,5]decane-1,3-dione.

6. 2-benzyl-8-(4′-p-fluorophenyl-4′-oxobutyl)-2,8-diazaspiro[4,5]decane-1,3-dione.

7. 2,4-dimethyl-8-(4′-p-fluorophenyl-4′-oxobutyl)-2,8-diazaspiro[4,5]decane-1,3-dione.

8. 2-methyl-4-isopropyl-8-(4′-p-fluorophenyl-4′-oxo-butyl)-2,8-diazaspiro[4,5]decane-1,3-dione.

9. 2-methyl-4-n-butyl-8-(4′-p-fluorophenyl-4′-oxo-butyl)-2,8-diazaspiro[4,5]decane-1,3-dione.

10. 2-methyl-4-benzyl-8-(4′-p-fluorophenyl-4′-oxo-butyl)-2,8-diazaspiro[4,5]decane-1,3-dione.

11. 2-benzyl-4-methyl-8-(4′-p-fluorophenyl-4′-oxo-butyl)-2,8-diazaspiro[4,5]decane-1,3-dione.

12. 2-methyl-4-phenethyl-8-(4′-p-fluorophenyl-4′-oxo-butyl)-2,8-diazaspiro[4,5]decane-1,3-dione.

References Cited by the Examiner

UNITED STATES PATENTS

| 1,915,334 | 6/33 | Salzberg et al. | 260—243 |
| 2,075,359 | 3/37 | Salzberg et al. | 167—22 |
| 2,640,055 | 5/53 | King et al. | 260—294 |
| 2,649,456 | 8/53 | Walter et al. | 260—294 |
| 3,039,930 | 6/62 | Gray | 167—65 |
| 3,068,147 | 12/62 | Emele | 167—65 |

FOREIGN PATENTS 609,766  4/63  Belgium.

NICHOLAS S. RIZZO, *Primary Examiner.*